April 16, 1935.  F. M. VANDERVOORT  1,998,034
CHANGE SPEED MECHANISM
Filed July 18, 1933  2 Sheets-Sheet 1
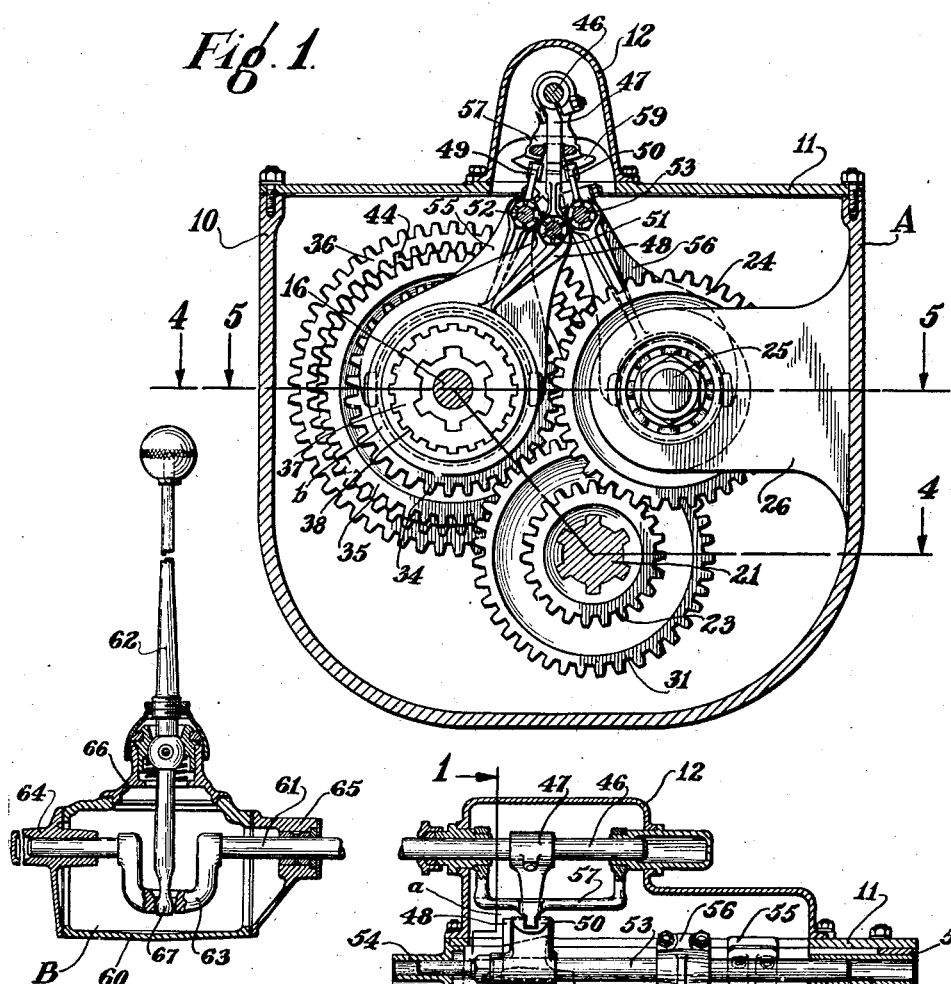
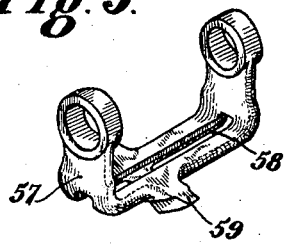
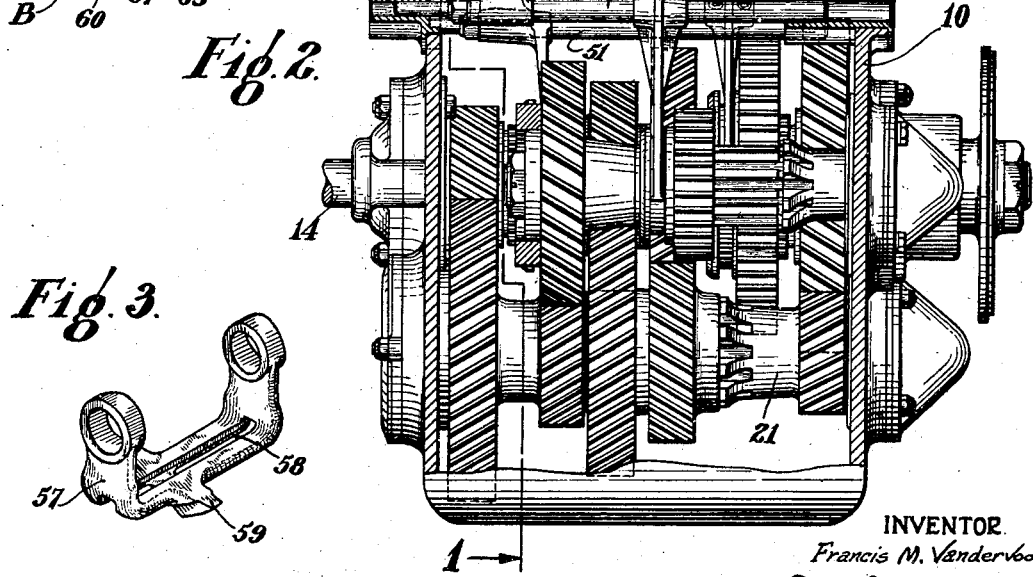
INVENTOR
Francis M. Vandervoort,
BY R M Cooper
ATTORNEY April 16, 1935.　　　F. M. VANDERVOORT　　　1,998,034
CHANGE SPEED MECHANISM
Filed July 18, 1933　　　2 Sheets-Sheet 2
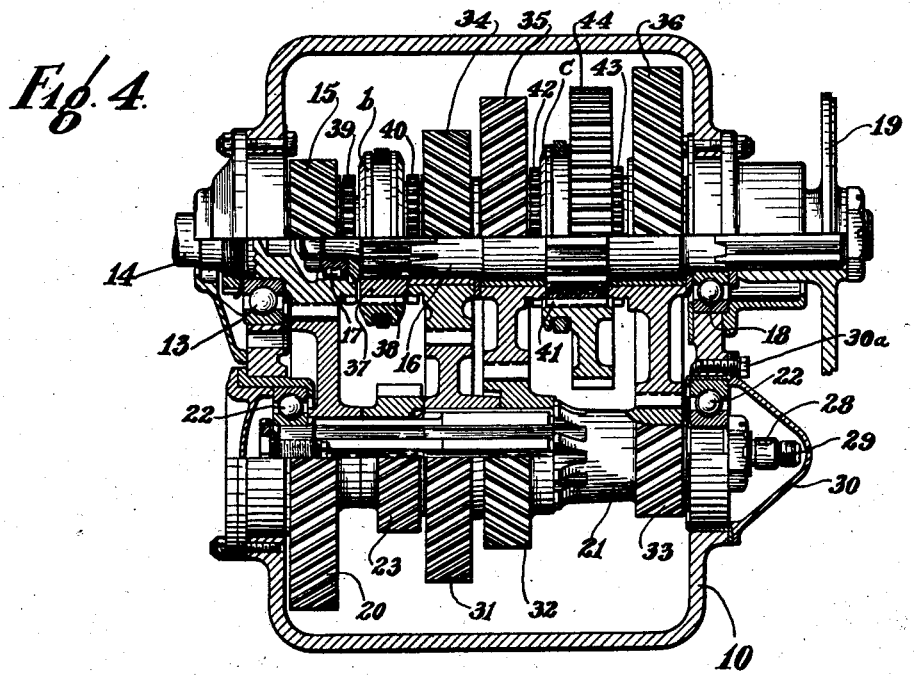
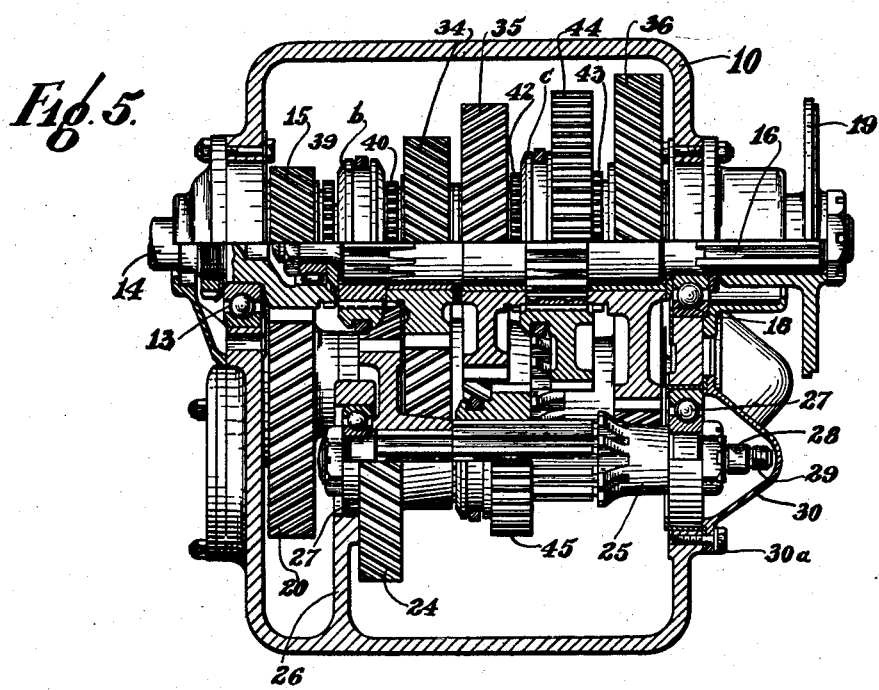
INVENTOR
Francis M. Vandervoort.
BY RMCooper
ATTORNEY Patented Apr. 16, 1935

1,998,034

UNITED STATES PATENT OFFICE 1,998,034

CHANGE SPEED MECHANISM

Francis M. Vandervoort, Cleveland, Ohio, assignor to The White Motor Company, Cleveland, Ohio, a corporation of Ohio Application July 18, 1933, Serial No. 680,943

2 Claims. (Cl. 74—333)

This invention relates to change speed mechanisms, and more particularly to change speed mechanisms for automotive vehicles.

It is an object of this invention to provide a simple and efficient change speed mechanism of the constant-mesh gear type.

It is a further object of this invention to provide a compact relatively short four-speed change speed mechanism of the type above defined.

It is a further object of this invention to provide an arrangement of gearing for producing a reverse drive which can be employed in conjunction with a forward speed gearing of the sliding-clutch type to secure a compact change speed gearing of relatively short length.

It is a further object of this invention to provide a change speed gear box having a plurality of readily accessible connections for taking off power.

Other objects will appear in the following description of an embodiment of the invention, when read in connection with the accompanying drawings in which:

Figure 1 is a sectional view of a change speed gear box, the section being taken on line 1—1 of Figure 2.

Figure 2 consists of a side elevation of the gear box shown in Figure 1 with a part of the casing broken away, and of a sectional view of a shifting mechanism used in conjunction with the gear box.

Figure 3 is a detail view of a swinging member mounted in the upper part of the gear box.

Figure 4 is a sectional view of the gear box taken on line 4—4 of Figure 1, and

Figure 5 is a sectional view of the gear box taken on line 5—5 of Figure 1.

Referring to the drawings the speed change mechanism therein illustrated comprises two units, a gear box A and a shifting mechanism B. The gear box A is constructed with a housing consisting of a main casing 10, a slotted cover 11 for the casing 10, and an auxiliary casing 12 which encloses the upper part of a shifting mechanism "a". Extending into the forward end of the casing 10 and supported by a bearing 13, there is a driving shaft 14 which when the gear box is installed within a motor vehicle is driven in a conventional manner by the engine of the vehicle. The inner end of the shaft 14 is formed with an integral gear 15 which is axially bored to provide a bearing for an aligned driven shaft 16. The driven shaft 16 is supported at its forward end within the gear 15 by means of a roller bearing 17, and at its rear end is supported within an aperture in the rear wall of the casing 10 by means of a ball bearing 18. Secured upon the rear end of the shaft 16 there is a flange member 19 through which the shaft 16 is connected with the driving mechanism of the vehicle upon which the gear box is installed. The gear 15 meshes with a gear 20 rigidly affixed upon a countershaft 21 mounted below the driven shaft 16 and supported in ball bearings 22 mounted in the end walls of the casing 10. Affixed upon the countershaft 21 adjacent the gear 20, there is a gear 23 which meshes with a gear 24 rigidly affixed upon a reverse shaft 25. The reverse shaft 25 is supported at its forward end in a web 26 formed in the forward end of the casing 10 by means of a ball bearing 27, and at its rear end in the rear wall of the casing 10 by means of a second ball bearing 27.

With an object of providing a plurality of connections for attaching mechanisms for driving auxiliary units such as pumps and winches, the countershaft 21 and the reverse shaft 25 are constructed so as to protrude through the rear wall of the casing 10, and the protruding portions formed with keyways 28 and threads 29 designed to facilitate the attachment thereto of power take-off mechanism. When not employed for the transmission of power, the protruding portions of the countershaft 21 and the reverse shaft 25 are housed within caps 30 removably secured to the rear wall of the casing 10 by screws 30a.

The countershaft 21 is equipped with three gears 31, 32 and 33 rigidly affixed thereto which mesh with three constantly driven gears 34, 35 and 36 rotatably mounted upon the driven shaft 16. Splined upon a sleeve 37 non-rotatably mounted on the forward end of the shaft 16, there is a clutch member "b", the inner splined teeth 38 of which are designed for engagement with teeth 39 formed on gear 15 and with teeth 40 formed on gear 34. Splined directly upon the shaft 16 intermediate the gears 35 and 36, there is a second clutch member "c" the inner splined teeth 41 of which are designed for engagement with teeth 42 on gear 35 and with teeth 43 on gear 36. The clutch member "c" is formed with a gear wheel 44 designed to mesh with a gear wheel 45 slidably splined upon the reverse shaft 25.

Assuming that in each instance the clutch members "b" and "c" and the gear 45 initially occupy the positions shown, four forward speeds and a single reverse speed are obtained as follows:

First speed, by shifting the clutch member "c" in a rearward direction to bring its teeth 41 into engagement with the teeth 43 on the gear 36, the resulting drive being through gears 15, 20, 33 and 36.

Second speed, by shifting the clutch member "c" in a forward direction to bring its teeth 41 into engagement with the teeth 42 on the gear 35, the resulting drive being through gears 15, 20, 32 and 35.

Third speed, by shifting the clutch member "b" in a rearward direction to bring its teeth 38 into engagement with the teeth 40 on the gear 34, the resulting drive being through gears 15, 20, 31 and 34.

Fourth speed or direct drive, by shifting the clutch "b" in a forward direction to bring its teeth 38 into engagement with the teeth 39 on the gear 15, and Reverse, by shifting the gear 45 on the reverse shaft to a position in which its teeth mesh with the teeth of the gear 44 on the clutch member "c", the resulting drive being through gears 15, 20, 23, 24, 45 and 44.

The shifting mechanism "a" associated with the gear box comprises a shaft 46 mounted for longitudinal movement and rotatable oscillation within the casing 12. Secured upon the shaft 46 is a finger 47, the free end of which is formed for engagement between the bifurcated upper ends of a fork 48 and members 49 and 50 mounted respectively on shifter rods 51, 52 and 53 supported in bushings 54 mounted in the end walls of the casing 10. The shifter rod 51 is connected to the clutch "b" by means of the fork 48, and the shifter rods 52 and 53 to the clutch "c" and the gear 45 by means of forks 55 and 56. Rotatably mounted within the casing 12 in concentric relation to the shaft 46, there is a cradle 57 formed with a slot 58 which receives the finger 47 and with lugs 59 designed for engagement between the bifurcated ends of the members 49 and 50 and the fork 48. This cradle turns with the finger 47 and through the instrumentality of the lugs 59 acts to lock the shifter rods in neutral position except when operatively connected to the finger 47.

The shifting mechanism B comprises a casing 60, a shaft 61 which is connected to the shaft 46 associated with the gear box, and a shifting lever 62. The shaft 61 is formed with a crank portion 63, and is slidably and rotatably mounted in bearings 64 and 65 in the front and rear walls of the casing 60. The shifting lever 62 is mounted for universal movement in a cover 66 secured to the top of the casing 60, and is formed at its lower end with a ball 67 which is engaged within a slot in the lower portion of the crank 63 of the shaft 61. Through this arrangement the lever 62 when moved longitudinally causes the shaft 61 and the co-ordinated shaft 46 to be shifted in a reverse direction, and when the lever 62 is moved transversely the shaft 61 and the co-ordinated shaft 46 are rotated in a corresponding direction.

In effecting a speed change the shafts 61 and 46 are rotated through transverse movement of the lever 62 moving the finger 47 out of engagement with the upper bifurcated end of one of the members 48, 49, or 50 into engagement with the end of another of such members. The lever 62 is then moved forwardly or rearwardly to effect the speed change desired with a resulting longitudinal movement of the rods 61 and 46 and the finger 47 producing a longitudinal movement of the shifter rod connected to the finger, and shifting the associated parts of the gear box. In accomplishing such operation, the cradle 57 is turned by the finger 47 to a position where one or the other of the lugs 59, or both of the lugs, depending upon the driving connection initiated, acts to lock in neutral positions, the shifter rod retaining such positions. It will be seen from an examination of the drawings that when the gear 45 on the reverse shaft is moved into mesh with the gear 44 on the clutch "c" to initiate a reverse drive, the shifter rod 52 and consequently the gear 44 will be locked in neutral position by the lug 59 shown at the left in Figure 1.

By constructing the speed change gearing in the manner described, it is possible to construct all the gears with helical teeth except the gears 44 and 45, and to thereby obtain a quiet drive in all forward speeds. By employing the gear combination 23, 24, 44 and 45 to produce reverse drive instead of a gear combination of conventional design, a considerable reduction in the length of the gear box is effected.

Although the foregoing description is necessarily of a detailed character, in order that the invention may be completely set forth, it is to be understood that the specific terminology is not intended to be restrictive or confining, and that various rearrangements of parts and structural details may be resorted to without departing from the scope and spirit of the invention as herein claimed.

What I claim is:

1. In a change speed mechanism for an automotive vehicle, a shaft, a plurality of gears disposed in concentric relation to said shaft and mounted for relative rotation with respect thereto, a second shaft located at one side of said first named shaft, a plurality of gears fixed on said second named shaft each meshing with one of the aforesaid gears associated with said first named shaft, means for driving said second shaft, two clutch members slidably and non-rotatably mounted on said first named shaft designed to connect such shaft with said first recited gears, said clutch members being mounted on opposite sides of a gear train formed by one of the gears associated with said first named shaft and one of the gears fixed on said second named shaft, a gear fixed on one of said clutch members, a gear fixed on said second shaft opposite the other clutch member, and means for establishing a driving connection between said last named gear and the gear on said clutch member comprising a third shaft located at one side of said first and second named shafts, and a pair of gears associated with said third shaft designed to mesh respectively with the last recited gear on said second shaft and the gear on said clutch member.

2. In a change speed mechanism for an automotive vehicle, a driven shaft, three gears mounted in concentric relation to said driven shaft in such a manner as to be capable of relative rotation with respect thereto, two of the gears of the aforesaid gears being mounted closely together and the other gear being spaced from the closely associated two gears, a clutch member slidably and non-rotatably mounted upon said driven shaft between the aforesaid closely associated gears and the aforesaid other gear designed to separately connect said driven shaft with one of said closely associated gears and with said other gear, a second clutch member mounted on said driven shaft at the opposite side of said closely associated gears from said first named clutch member designed to connect said driven shaft with the other gear of said closely associated gears, a second shaft located at one side of said driven shaft, means for driving said second shaft, three gears fixed on said second shaft each meshing with one of the aforesaid gears associated with said driven shaft, a gear on said first named clutch member, a fourth gear fixed on said second shaft opposite said second named clutch member, a reverse shaft mounted adjacent said driven shaft and said second shaft, a gear fixed on said reverse shaft meshing with the aforesaid fourth gear on said second shaft, and a reverse gear slidably and non-rotatably mounted upon said reverse shaft arranged to be moved into and out of mesh with the gear on said first named clutch member.

FRANCIS M. VANDERVOORT.